(12) United States Patent
Andres

(10) Patent No.: US 6,855,288 B2
(45) Date of Patent: Feb. 15, 2005

(54) COOLING AND COUNTER-PRESSURE METHOD FOR PRODUCING PLASTIC PARTS BY INJECTION

(75) Inventor: Pablo Escribano Andres, Burgos (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 99 days.

(21) Appl. No.: 10/221,150

(22) PCT Filed: Jan. 10, 2001

(86) PCT No.: PCT/ES01/00004

§ 371 (c)(1),
(2), (4) Date: Jan. 24, 2003

(87) PCT Pub. No.: WO02/055281

PCT Pub. Date: Jul. 18, 2002

(65) Prior Publication Data

US 2003/0146552 A1 Aug. 7, 2003

(51) Int. Cl.[7] .......................... B29D 22/00; B29D 9/00
(52) U.S. Cl. ...................... 264/510; 264/519; 264/572
(58) Field of Search ................................ 264/510, 519, 264/572

(56) References Cited

U.S. PATENT DOCUMENTS 4,164,523 A * 8/1979 Hanning ...................... 264/28
4,208,177 A     6/1980 Allen
5,730,926 A * 3/1998 Matsumoto et al. ........ 264/500
5,997,797 A * 12/1999 Heuchert .................... 264/500
6,403,014 B1 * 6/2002 Hendry et al. .............. 264/500

OTHER PUBLICATIONS

Patent Abstracts of Japan "Injection Molding Device" Inventor: Takahashi Toshihiro; Filing Date: Jul. 19, 1996; Date of Publication: Feb. 10, 1998.
Patent Abstracts of Japan "Production of Molded Object" Inventor: Shingu Shigeo; Filing Date: May 2, 1994; Date of Publication: Nov. 14, 1995.
Patent Abstracts of Japan "Production of Molded Object" Inventor: Suga Tetsuo; Filing Date: Dec. 27, 1988; Date of Publication: Jul. 6, 1990.
Patent Abstracts of Japan "Injection Molding Method of Synthetic Resin" Inventor: Yasuike Akio et al. Filing Date: May 9, 1979; Date of Publication: Nov. 18, 1980.
Patent Abstracts of Japan "Production of Panel Product" Inventor: Kamiyama Tadamasa Filing Date: May 7, 1993; Date of Publication: Nov 15, 1994.

* cited by examiner

Primary Examiner—Suzanne E. McDowell
(74) Attorney, Agent, or Firm—Browdy and Neimark, P.L.L.C.

(57) ABSTRACT

A cooling procedure for the manufacture of plastic parts by injection, that uses a gas under pressure that is lodged in the cavity provided by the two mould parts (1, 2) during at least the cooling phase. The cold gas, and its application, covers both coated and non-coated part.

17 Claims, 2 Drawing Sheets

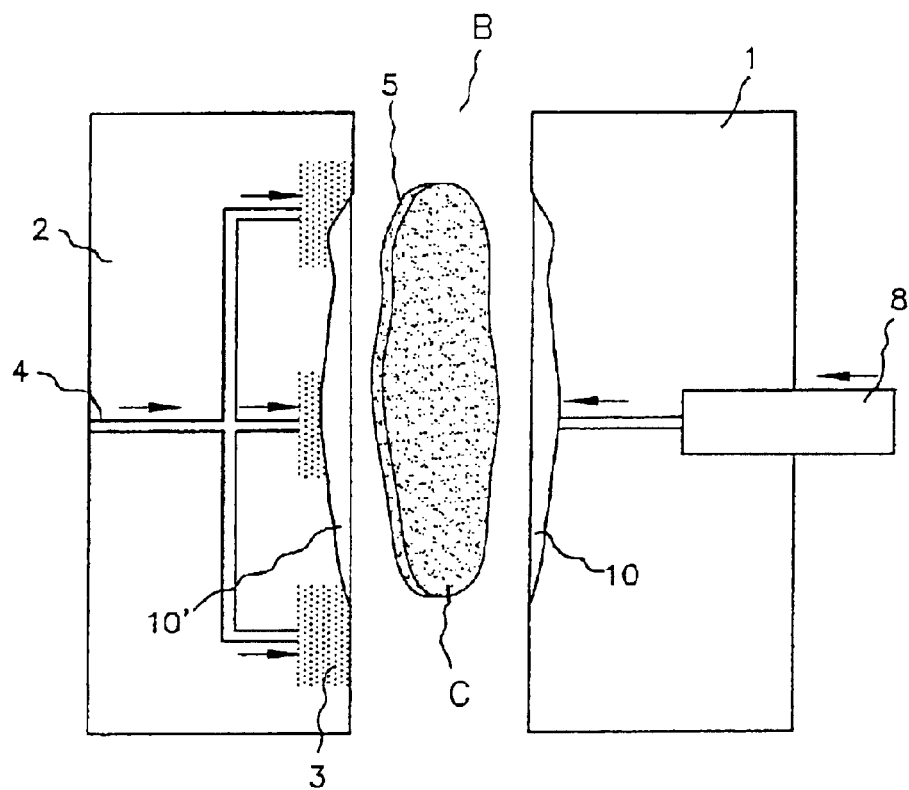
Fig:2
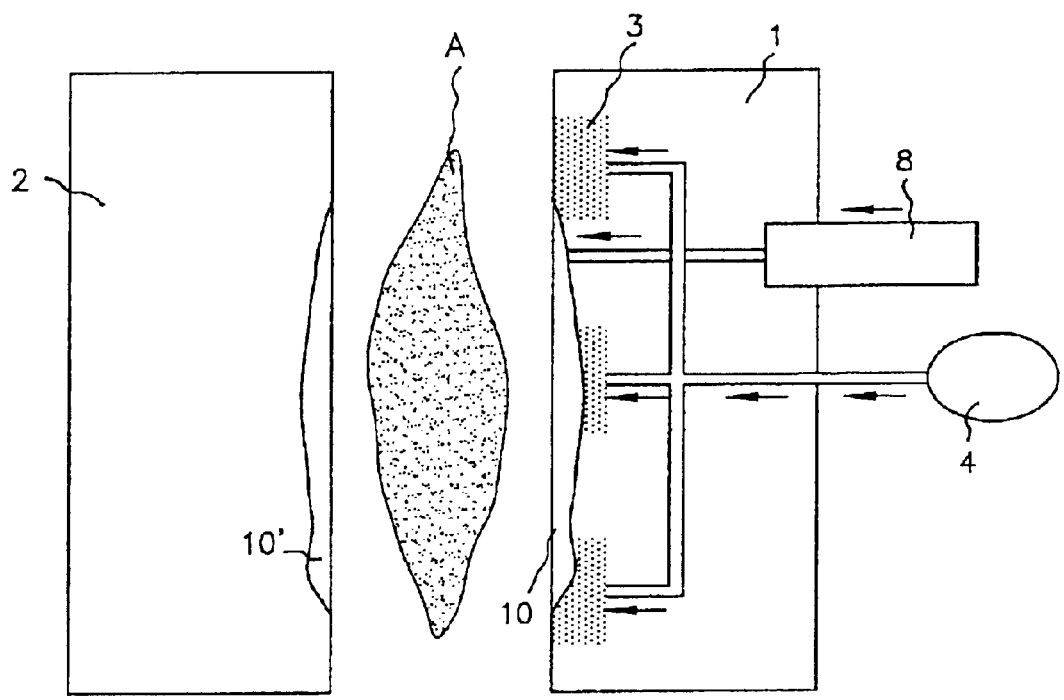
Fig:1

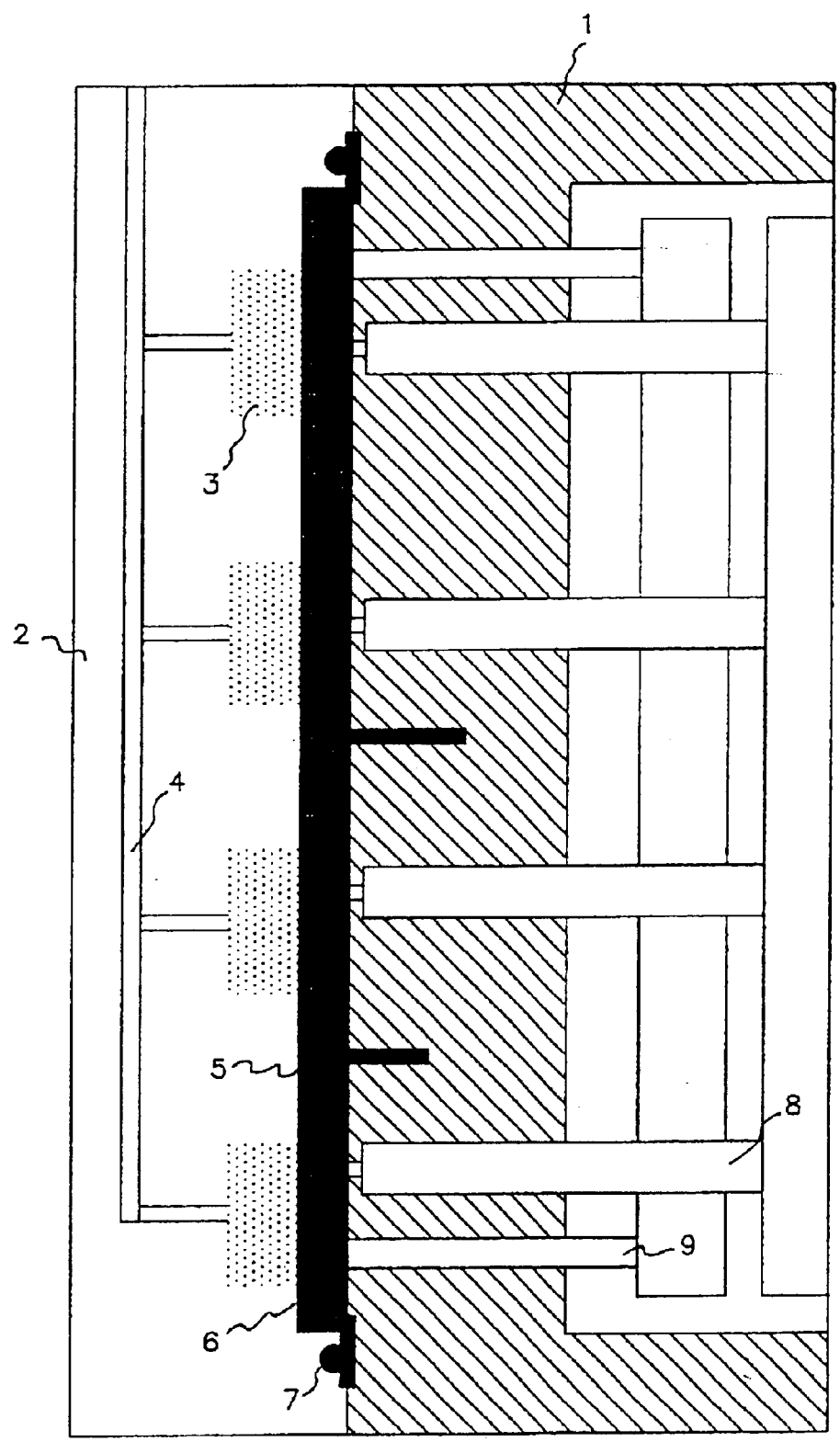
Fig:3

COOLING AND COUNTER-PRESSURE METHOD FOR PRODUCING PLASTIC PARTS BY INJECTION

BACKGROUND OF THE INVENTION

1. Technical Field of the Invention

This inventions relates to a cooling and counterpressure or backpressure procedure for manufacturing plastic parts by the injection process, in which it is important to obtain a good appearance one of the sides of the part, the visible side, which might or might not be occupied by a decorative coating, which could be a plastic film, plastic foam, textile fabric, etc.

2. Prior Art

One of the most commonly used processes for obtaining plastic parts of this type, whether coated or not, is conventional plastic injection and, within this general technique, the variants that make it possible for the injection pressure, sequential injection and injection-compression processes to be lowered.

These processes consist of the following phases:

Placing the coating inside the mould, when dealing with a coated part.

Total or partial closure of the mould (the latter in the injection-compression process).

Injection of the material into the cavity of the mould.

Total closure of the mould (only in the case of injection-compression).

Compacting.

Cooling, based on the circulation of fluids inside the cooling circuits in the mould or other cooling systems.

Opening of the mould.

Ejection or removal of the part.

As indicated previously, in some processes, and especially for parts for the automotive industry, a coating is applied inside the cavity in order to decorate and/or insulate the component.

During the mould filling phase, if a coating is applied inside the cavity, the appearance of this coating deteriorates due to the high temperature of the material when it is injected and the high pressures which are created inside the cavity.

When the part is not coated and in order to perfectly copy the half of the mould that corresponds to the visible side of the part and also to compensate for the contracting of the material, it becomes necessary, once the filling of the cavity in the mould has finished, to apply a pressure called compacting or compaction pressure.

After this phase, the mould is cooled for a certain time, in a process in which this cooling time directly affects the productivity of the mould and, as a result, the final cost of the part to be produced.

Within the field of plastic injection moulding, a method is known though U.S. Pat. No. 3,345,687 in which air at low pressure is injected into the cavity in the mould through a composite material, simultaneously with the injection of the plastic material into the mould cavity or immediately after the injection while the thermoplastic material is hot.

With the application of this technique, an appropriate counterpressure is not achieved on the parts being produced, so that, in the case of coated parts, the coating is not suitably protected, whereas in the case of non-coated parts, unwanted sinkholes and warpage are not avoided.

Moreover, it has been found to be insufficient in practice, due to the relative slowness of the cooling process, which results in a cost of a certain consideration for each part produced.

In the same way, with this technique, a good surface quality in the finish of the parts is not achieved, whether coated or non-coated, and it has been found that in the case of coated parts, the coating has been substantially altered in relation to its initial appearance, which is the required finish.

OBJECT AND SUMMARY OF THE INVENTION

One object of this invention is to provide a cooling and counterpressure process for producing plastic parts by injection that manages to provide a suitable counterpressure that results in a high quality surface appearance of the parts, whether these are coated or non-coated.

Another object of the invention is to provide a cooling and counterpressure process for producing plastic parts by injection according to which a substantial reduction is achieved in the cooling and solidification, thus shortening the total cycle time and leading to units which are more economical to produce.

Another object of the invention is to provide a process that prevents any type of sinkholes and warpage in the parts to be produced.

Another object of the invention is to provide a process that practically does not alter the features of the coating on the parts, preventing them from being deteriorated.

In order to achieve these objectives, the starting point is the traditional technique consisting of the use of a mould composed of two parts, mobile and fixed, one of which, in the area of the surface that is in contact with the part, is made at least partially with porous material.

The areas of porous material are connected to a unit that allows the supply of a fluid, in which the porous material is obviously permeable to the passage of the fluid in question and the fluid used is a gas under pressure.

Within this context, the invention claims the use of cold gas in order to achieve the objectives listed earlier, with this gas being included in a range of temperatures of between −196° C. and 50° C., and at a pressure of between 5 and 500 bar.

In these conditions regarding temperature and pressure, the gas is injected into the closed mould and through the porous material, preferably on the visible side of the material when dealing with a material provided with coating.

The injection of the plastic material is usually carried out through the fixed part of the mould, except in those cases when it is carried out through the edge of the part.

The intake of gas, in the pressure and temperature conditions mentioned earlier, causes the gas to circulate through the interior of the cavity, with it being evacuated or removed to the exterior through suitable means, such as, for example, adjustable valves, etc.

The visible side of the plastic part, whether coated or not, will correspond with the side of the mobile part of the mould.

In any case, the circulation of cold gas in the inside of the mould is regulated and maintained thanks to a suitable gasket arranged around the mould cavity once it is closed and with one or more outlet channels that allow the removal of the gas while maintaining the pressure.

In accordance with this invention, the stages of the production cycle for non-coated parts would be as follows:

Closure of the mould.

Injection of the plastic material at its process temperature of between 180 and 320° C., through the fixed part of the mould.

Injection of the gas into the mould, through a porous material arranged in the fixed part of the mould, at a temperature of between −196° C. and 50° C. and a pressure of between 5 and 500 bar, for a certain time. In this gas injection phase, there might be regulation in several stages, with different pressures, temperatures and process lengths. In the same way, there might be circulation of gas, which is controlled by means of exhaust or evacuation ports or holes, as indicated previously.

Cooling time.

Opening of the mould.

Ejection or removal of the part.

For coated parts the production cycle would be as follows:

Placing of the coating inside the mobile part of the mould, where it might be fixed with pins or clips, for example.

Closure of the mould.

Injection of the plastic material at its process temperature of between 180 and 320° C., through the fixed part of the mould.

At the same time, overlapping with it, or after the injection of the plastic, the gas is also injected into the mould, at a temperature of between −196° C. and 50° C. and a pressure of between 5 and 500 bar. As with the case of non-coated parts, the injection phase can be regulated into several stages with different pressures, temperatures and process lengths. The gas is applied through a porous material arranged in the mobile part of the mould.

Cooling time.

Opening of the mould.

Ejection or removal of the part.

BRIEF DESCRIPTION OF THE DRAWINGS

On the accompanying sheets of drawings, ways of operating the invention are shown, which are represented as follows:

FIG. 1 is a schematic view that represents the method of action, in accordance with the invention, when dealing with non-coated parts.

FIG. 2 is another similar schematic view that refers to the method of action for coated parts.

FIG. 3 represents an enlargement of the contents of FIG. 2.

DETAILED DESCRIPTION OF THE PREFERRED EMBODIMENT(S) OF THE INVENTION

With regard to this FIG. 3, it is pointed out that the fixed part (1) and the mobile part (2) of the mould are shown. In the latter we can appreciate the distributed porous areas (3), which the gas arrives at through a general supply pipe (4).

Illustrated in the fixed part (1) of the mould are the system (8) for injecting the plastic material and the system (9) for ejecting or expelling the already finished part.

In the cavity we can observe the injected material (6) which has been infected at a process temperature between 180 and 320° C., the coating in question (5) and the perimetric gasket (7) around this cavity, which might be equipped with exhaust holes in order to remove the gas.

The porous areas (3) of the mobile part (2) of the mould are situated either well separated, as illustrated, or otherwise forming a single porous area in the said mobile part. The porous areas can also possibly be situated in the fixed part of the mould, as we shall see later.

In FIG. 1, we emphasis the fixed part (1) of the mould, with the injection system (8) for the plastic material and the areas of porous material (3) at the intake (4) and the cavity (10) to receive the plastic material.

The non-coated part (A) to be produced is shown in this diagram, with its visible side corresponding with the base of the cavity (10') cot into the mobile part (2) of the mould.

Looking now at FIG. 2, we emphasis the fixed part (1) of the mould with the cavity (10) and the intake for the infection system (8) for the plastic material. The mobile part (2) of the mould is the one that in this case includes the areas of porous material (3), with the gas intake (4) and the cavity (10').

The coated part (B) to be produced is composed of the plastic base (C) and the coating (5) which is on the base side of the cavity (10') in the mobile part (2) of the mould.

The gas used for the cooling and consequent improvement of the quality of the visible sides of the parts is usually inert, although at times chemically active gases that would enable the modification of the chemical structure of the part to be produced without detriment as to its quality, for example by lowering the crystallinity level of the material or by raising its transparency level, might be used.

The gas is introduced at a temperature of between 196° C. and 50° C. and at a pressure between 5 and 500 bar might possibly include additives, with which other modifications in the final product are achieved.

The porous material for the passage of the gas might totally or partially cover the surface of the part to be obtained, whether this is coated or non-coated.

The exhaust holes for the evacuation of the gas can be of several types, for example: the natural outlet when a mould without a gasket is used, grooves cut in the moulds, open areas in the sealing gasket when this type of gasket is used, leak-tight joint combined with holes controlled by valves inside the mould, etc. and even combinations of these alternatives.

The gas can remain lodged in the porous material at the start of the plastic material injection stage, at an intermediate stage during the injection or else once that this injection has finished.

The evacuation or removal of the gas used, as mentioned previously, can be carried out by several methods.

For example, through the closure system of the mould itself, which is usually not totally leak-tight, thus allowing this evacuation.

In the same way, by making grooves or holes in the mould itself, the gas can be allowed to escape in a suitable way.

If the system includes seals, these can include valves in order to obtain the evacuation of the gas, they can also have split areas in their own structure through which evacuation is carried out, or they can be a combination of both forms of procedure, valves and non-continuous areas.

What is claimed is:

1. Cooling and counterpressure procedure for manufacturing plastic parts by the injection process, using a cavity (10, 10') provided between a fixed part (1) of a mould and a mobile part (2) of the same mould, with plastic material being injected into the said cavity once it has been closed, and the said cavity having an auxiliary intake (4) for gas to circulate through its interior through a porous material (3) fitted in the moulds, which is characterised in that the gas to be introduced into the cavity (10, 10') is at a low temperature, of between −196° C. and 50° C., and circulates through the said cavity during the cooling phase of the plastic material and over one of the sides of the material, in that the gas to be introduced and circulate through the cavity is at a pressure of between 5 and 100 bar.

2. Cooling and counterpressure procedure for manufacturing plastic parts by the injection process, in accordance with claim 1, characterised in that when the part to be obtained is part covered with a coating, the gas is introduced and circulates in the cavity in the mould, at the side where the coating is to be found through the porous material (3) fitted in the mobile part (2) of the mould.

3. Cooling and counterpressure procedure for manufacturing plastic parts by the injection process, in accordance with claim 2, characterised in that a gasket (7) is fitted around the cavity in the mould.

4. Cooling and counterpressure procedure for manufacturing plastic parts by the injection process, in accordance with claim 2, characterised in that during the gas injection phase, this can be regulated in several stages with different temperatures, pressures and process lengths.

5. Cooling and counterpressure procedure for manufacturing plastic parts by the injection process, in accordance with claim 1, characterised in that when the part to be obtained is a non-coated part, the gas is lodged and circulates in the cavity at the opposite side to the visible side of the part through the porous material (3) fitted in the fixed part (1) of the mould.

6. Cooling and counterpressure procedure for manufacturing plastic parts by the injection process, in accordance with claim 5, characterised in that a gasket (7) is fitted around the cavity in the mould.

7. Cooling and counterpressure procedure for manufacturing plastic parts by the injection process, in accordance with claim 5, characterised in that during the gas injection phase, this can be regulated in several stages with different temperatures, pressures and process lengths.

8. Cooling and counterpressure procedure for manufacturing plastic parts by the injection process, in accordance with claim 1, characterised in that the gas is introduced and circulates inside the cavity from the start of the injection of the plastic material.

9. Cooling and counterpressure procedure for manufacturing plastic parts by the injection process, in accordance with claim 1, characterised in that the gas is lodged and circulates inside the cavity, during the injection of the plastic, after the start of the process.

10. Cooling and counterpressure procedure for manufacturing plastic parts by the injection process, in accordance with claim 1, characterised in that the porous material (3) covers, at least partially, the surface of the part to be produced.

11. Cooling and counterpressure procedure for manufacturing plastic parts by the injection process, in accordance with claims 1, characterised in that a gasket (7) is fitted around the cavity in the mould.

12. Cooling and counterpressure procedure for manufacturing plastic parts by the injection process, in accordance with claims 1, characterised in that during the gas injection phase, this can be regulated in several stages with different temperatures, pressures and process lengths.

13. Cooling and counterpressure procedure for manufacturing plastic parts by the injection process, in accordance with claim 1, characterised in that the gas used is an inert gas.

14. Cooling and counterpressure procedure for manufacturing plastic parts by the injection process, in accordance with claims 13, characterised in that the gas includes additives.

15. Cooling and counterpressure procedure for manufacturing plastic parts by the injection process, in accordance with claim 1, characterised in that the gas used is an active gas.

16. Cooling and counterpressure procedure for manufacturing plastic parts by the injection process, in accordance with claim 15, characterised in that the gas includes additives.

17. Cooling and counterpressure procedure for manufacturing plastic parts by the injection process, in accordance with claim 1, characterised in that the circulation of the gas is controlled by systems that facilitate its evacuation.

\* \* \* \* \*